(12) United States Patent
Huppunen et al.

(10) Patent No.: US 8,698,368 B2
(45) Date of Patent: Apr. 15, 2014

(54) ELECTRIC MOTOR, HOISTING MACHINE AND ELEVATOR SYSTEM

(75) Inventors: Jussi Huppunen, Lappeenranta (FI); Asmo Tenhunen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 13/604,406

(22) Filed: Sep. 5, 2012

(65) Prior Publication Data
US 2013/0015020 A1 Jan. 17, 2013

Related U.S. Application Data

(63) Continuation of application No. PCT/FI2011/050270, filed on Mar. 30, 2011.

(30) Foreign Application Priority Data

Mar. 31, 2010 (FI) .................................... 20105339

(51) Int. Cl.
H02K 21/12 (2006.01)
H02K 1/06 (2006.01)

(52) U.S. Cl.
USPC ............ 310/156.38; 310/156.44; 310/156.45; 310/216.112

(58) Field of Classification Search
USPC ............ 310/156.38, 156.44, 156.45, 156.47, 310/216.112
See application file for complete search history.

(56) References Cited

U.S. PATENT DOCUMENTS

| | | | |
|---|---|---|---|
| 4,642,502 A | | 2/1987 | Carpenter et al. |
| 5,705,871 A | * | 1/1998 | Suzuki et al. ............ 310/156.44 |
| 5,811,906 A | * | 9/1998 | Hakala et al. ................. 310/183 |
| 2005/0168089 A1 | * | 8/2005 | Miyashita et al. ....... 310/156.57 |
| 2009/0071759 A1 | | 3/2009 | Yu et al. |
| 2009/0160283 A1 | * | 6/2009 | Bott et al. ................ 310/156.47 |
| 2009/0251024 A1 | * | 10/2009 | Huppunen et al. ............ 310/195 |

FOREIGN PATENT DOCUMENTS

| | | |
|---|---|---|
| EP | 0734112 A1 | 9/1996 |
| EP | 2101395 A2 | 9/2009 |
| JP | 2000-333391 A | 11/2000 |
| JP | 2004-15880 A | 1/2004 |
| WO | WO 2009/037374 A1 | 3/2009 |

* cited by examiner

Primary Examiner — Tran Nguyen
Assistant Examiner — Jose Gonzalez Quinones
(74) Attorney, Agent, or Firm — Birch, Stewart, Kolasch & Birch, LLP

(57) ABSTRACT

An electric motor, a hoisting machine and also an elevator system are disclosed. The electric motor includes a stator, which stator includes slots, into which slots a concentrated winding is fitted. The electric motor also includes a rotating rotor, which rotor includes permanent magnets placed consecutively in a ring in the direction of the rotational movement. The ratio ($L_M/L_P$) of the width of a permanent Lp magnet at the point ($L_M$) of the center line of the magnet and the width ($L_P$)' of a magnetic pole of the rotor is at least ⅔ and at most ⅘.

16 Claims, 5 Drawing Sheets

US 8,698,368 B2

ELECTRIC MOTOR, HOISTING MACHINE AND ELEVATOR SYSTEM

CROSS REFERENCE TO RELATED APPLICATIONS:

This application is a continuation of PCT/FI2011/050270 filed on Mar. 30, 2011, which claims priority under 35 U.S.C. 119(a) to patent application Ser. No. 20105339 filed in Finland on Mar. 31, 2010, all of which are hereby expressly incorporated by reference into the present application.

FIELD OF THE INVENTION

The invention relates to the structures of electric motors and more particularly to the structures of permanent-magnet motors.

BACKGROUND OF THE INVENTION

It is a general aim to utilize built space as efficiently as possible. For example, owing to space requirements, one aim is to make the hoisting machines of elevators as compact as possible. In order to achieve this, hoisting machines are designed to be as flat as possible in their dimensions in the direction of the axis of rotation, in which case the hoisting machines fit better in connection with, for instance, the wall part of the elevator hoistway or into some other corresponding narrow space. On the other hand, the aim in some solutions has been to design the hoisting machine so as to be as small as possible in its dimensions in the radial direction, such that the hoisting machine fits better e.g. in connection with the top end or the bottom end of the elevator hoistway.

In recent times permanent-magnet motors have started to be used in the electric motors of hoisting machines, which permanent-magnet motors comprise a concentrated stator winding that is wound into two adjacent slots around the stator tooth. In a concentrated winding the proportion of the winding overhang remains shorter than in a conventional diamond winding, in which case the size of the hoisting machine also decreases.

The use of a concentrated winding, however, causes problems. The density distribution of the magnetic flux produced by a concentrated winding in the air gap of an electric motor differs significantly from sinusoidal, and therefore contains a lot of harmonics. Harmonics, on the other hand, produce vibration and disturbing noise in a motor.

SUMMARY OF THE INVENTION

The aim of the invention is to present a permanent-magnet motor, in which the vibration and noise caused by the harmonics of the magnetic field is reduced by developing the placement and the shape of the permanent magnets. To achieve this aim the invention discloses an electric motor according to claim 1, a hoisting machine according to claim 11, and also an elevator system according to claim 13. The preferred embodiments of the invention are described in the non-independent claims.

The electric motor according to the invention comprises a stator, which stator comprises slots, into which slots a concentrated winding is fitted. The electric motor also comprises a rotating rotor, which rotor comprises permanent magnets placed consecutively in a ring in the direction of the rotational movement. The ratio $$\frac{L_M}{L_P}$$

of the width of a permanent magnet at the point $L_M$ of the center line of the magnet and the width $L_P$ of the magnetic pole of the rotor is at least $2/3$ and at most $4/5$. In degrees of electrical angle this means that the width of a permanent magnet at the point $L_M$ of the center line of the magnet ranges between 120-144 degrees of electrical angle. The term degrees of electrical angle refers to the angle value set by the cycle length of the fundamental frequency of the magnetic flux circulating in the air gap between the rotor and the stator. Thus 180 degrees of electrical angle is obtained for the width $L_P$ of the magnetic pole of the rotor. The term center line of a magnet refers to a ring in the direction of rotational movement of the rotor, which is situated at essentially the geometrical center point of the magnet, in other words the length of the magnet in the direction of a right angle to the center line is the same on both sides of the center line.

In a preferred embodiment of the invention the direction of at least one side of a permanent magnet on the rotor differs from the direction of the stator slot with a slot inclination s, the ratio $$\frac{s}{L_P}$$

of which slot inclination s and the width $L_P$ of a magnetic pole of the rotor is at least $5/36$ and at most $1/5$. In degrees of electrical angle this means that the slot inclination ranges between 25-36 degrees of electrical angle.

By means of the placement of the rotor magnets and of the shaping of the magnet, as presented above, the vibration and noise caused by the harmonics of the magnetic flux can be reduced, particularly in those types of electric motors in which a concentrated fractional-slot winding is fitted into the stator slots of the electric motor, the slots per pole and phase q of which winding is smaller than 0.5, most preferably 0.3. The aforementioned slot inclination of a permanent magnet can preferably be implemented by shaping the permanent magnets of the rotor to be essentially arrow-shaped.

The electric motor according to the invention is preferably an axial flux motor, in which the air gap between the stator and the rotor is essentially in the direction of the axis of rotation of the rotor. The tip of an arrow-shaped permanent magnet on the rotor of an axial flux motor is preferably disposed farther from the axis of rotation of the rotor than the center line of the aforementioned permanent magnet. The permanent magnet can be shaped such that the width of the permanent magnet increases when the distance from the axis of rotation of the rotor increases. In this case the shaping of the permanent magnet increases the torque of the motor, because a larger part of the magnetic flux of the motor in this case travels in a part of the electric motor that is disposed farther in the radial direction from the axis of rotation of the rotor. The electric motor according to the invention can also be a radial flux motor, in which the air gap between the stator and the rotor is essentially in the direction of the radius of the electric motor.

The magnetic poles of consecutive permanent magnets in the rotor of an electric motor according to the invention are preferably of opposite directions to each other.

With regard to the second aspect the invention relates to a hoisting machine, which comprises an electric motor of the type disclosed above. In the hoisting machine the stator of the electric motor is preferably disposed in a stationary structure of the hoisting machine, and the rotor of the electric motor is preferably disposed in a rotating structure of the hoisting machine. The rotating structure of the hoisting machine comprises a traction sheave. When using an electric motor according to the invention, the vibration and noise of the hoisting machine can be reduced.

With regard to the third aspect, the invention relates to an elevator system, which comprises any hoisting machine of the type disclosed above, for moving an elevator car in an elevator hoistway. In an elevator system according to the invention, the hoisting machine, owing to its smaller size and quieter noise level, can be disposed preferably in the elevator hoistway.

In a preferred embodiment of the invention the rotor is disposed on a first side of the rotating structure of the hoisting machine, and the traction sheave is disposed on the opposite side of the rotating structure of the hoisting machine. The traction sheave is fixed to the same piece as the rotor. The traction sheave can be integrated into the same piece as the rotor; the hoisting machine can also comprise a fixing means, such as a bolt, for fixing and/or detaching the traction sheave. This can be a benefit e.g. if the traction sheave must be replaced because of wear or malfunction. Replacement of the traction sheave can be necessary e.g. owing to wear of the rope grooves in the surface part of the traction sheave. The metallization of the grooves or the coating, such as polyurethane or corresponding, of coated grooves might wear owing to, inter alia, slipping of the ropes. Also the geometry of the grooves affects the wearing.

In a preferred embodiment of the invention, the traction sheave is hollow. The rotating structure of the hoisting machine can therefore be made to be extremely rigid, but the structure is simultaneously light and fits into a small space. The size of the hoisting machine can also be further reduced by disposing e.g. the machinery brake and/or the sensor that measures the movement of the rotating part of the hoisting machine inside a hollow traction sheave. The braking surface of the machinery brake can also be formed on the inner surface of the ring part of the hollow traction sheave.

The rotating structure of the hoisting machine is preferably made from a material that conducts magnetic flux, at least in the immediate proximity of the permanent magnets. In a preferred embodiment of the invention the thickness of the permanent magnets in the direction of the air gap is essentially constant; the aforementioned thickness of the permanent magnets in the direction of the air gap can, however, also vary such that with the variation in thickness it is endeavored to achieve a density distribution of magnetic flux that is as sinusoidal as possible in the air gap of the magnetic circuit.

The aforementioned permanent magnets of the rotor are preferably fitted into a fixing matrix, which in order to reduce eddy currents is made from a material that does not conduct electricity, or conducts electricity poorly, such as from glass fiber composite, stainless steel or corresponding. The permanent magnets can, however, also be fixed e.g. by embedding them into the rotating structure of the hoisting machine into recesses to be machined for this purpose.

In a preferred embodiment of the invention, the rotating structure of the hoisting machine is supported on the stationary shaft of the hoisting machine via bearings. The shaft can also be made hollow, in which case the hoisting machine lightens without essentially weakening the rigidity of the hoisting machine. The hollow structure of the shaft and/or of the traction sheave also means that the amount of raw material needed for manufacturing the hoisting machine decreases.

The sensor that measures the movement of a rotating structure of the hoisting machine can also be disposed inside the hollow shaft.

Drum brakes or disc brakes, for example, can be used as machinery brakes of the hoisting machine according to the invention. The braking surface is preferably formed into a rim-like ring as an extension of the outermost ring of the rotating structure of the hoisting machine, e.g. into the brake disc of a disc brake or into the brake ring of a drum brake.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
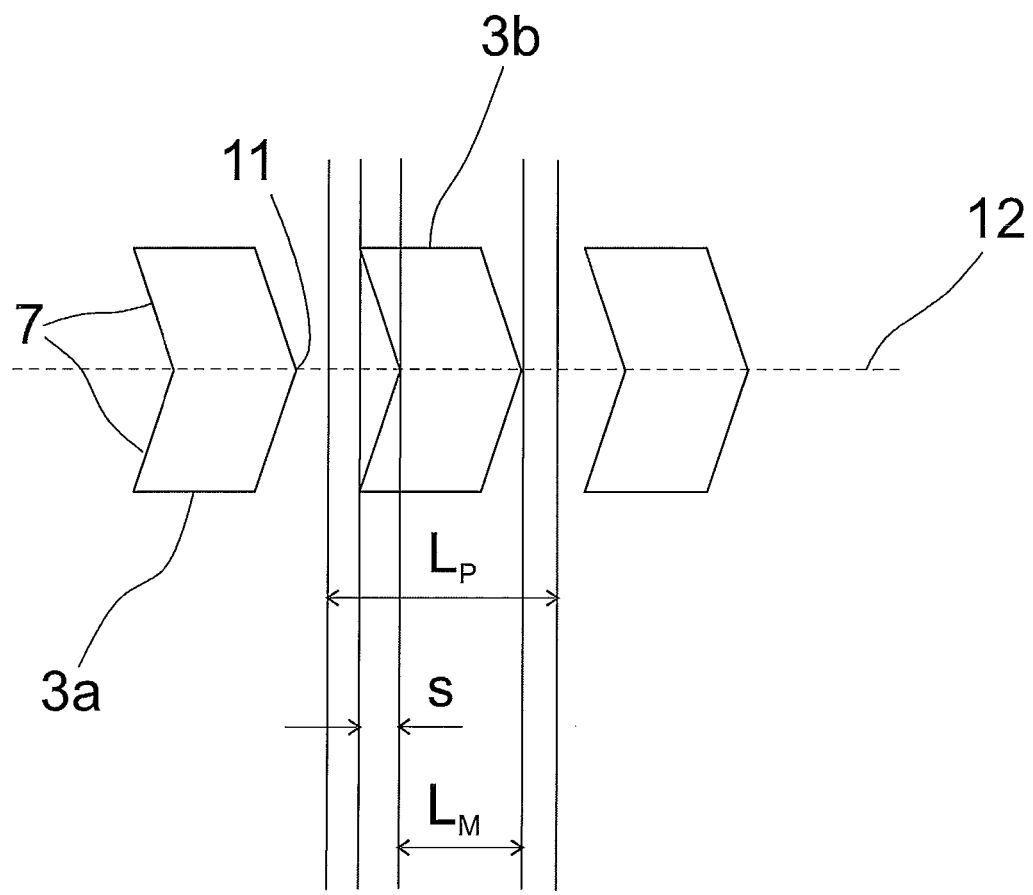
FIG. 1 illustrates the placement of permanent magnets on the surface of the rotor

FIG. 1 presents permanent magnets disposed consecutively on the surface of a rotor of a permanent-magnet synchronous motor according to the invention in a ring 12 in the direction of the rotational movement, presented from the direction of the air gap. In FIG. 1 the ring 12 in the direction of rotational movement is, for the sake of clarity, presented when straightened out, in which case the permanent magnets are disposed in a ring in the direction of rotational movement consecutively in a straight line. The permanent magnets are essentially arrow-shaped. The dimensions and placement of the permanent magnets 3a, 3b on the rotor are selected such that the ratio $$\frac{L_M}{L_P}$$

of the width of each permanent magnet 3a, 3b at the point $L_M$ of the center line 12 of the magnet and the width $L_P$ of the magnetic pole of the rotor is at least ⅔ and at most ⅘. In degrees of electrical angle this means that when the width $L_P$ of a magnetic pole is 180 degrees of electrical angle, the width of a permanent magnet at the point $L_M$ of the center line 12 of the magnet ranges between 120-144 degrees of electrical angle. The motor also comprises a stator (not shown in figure), which comprises slots for the stator winding. The stator slots are disposed at a right angle with respect to the ring 12 in the direction of the rotational movement. The direction of the sides of a permanent magnet that end in a tip 11, as likewise of the sides 7 disposed on the opposite side of the permanent magnet, differs from the direction of the stator slots with a slot inclination s, the ratio $$\frac{s}{L_P}$$

of which slot inclination s and the width $L_P$ of a magnetic pole of the rotor is at least 5/360 and at most 1/5. In degrees of electrical angle this means that the slot inclination s ranges between 25-36 degrees of electrical angle. A concentrated fractional-slot winding is fitted into the stator slots, the slots per pole and phase q of which winding is smaller than 0.5. The slots per pole and phase q indicates the number of stator slots per phase and per pole of the motor. When the slots per pole and phase is less than 0.5, with the shaping and placement of a permanent magnet that are presented above the harmonics of the magnetic flux circulating in the air gap of a motor can be reduced, in which case the torque ripple of the motor that is produced by vibration also decreases; and at the same time disturbing noise caused by operation of the motor also decreases.

Figure 2:
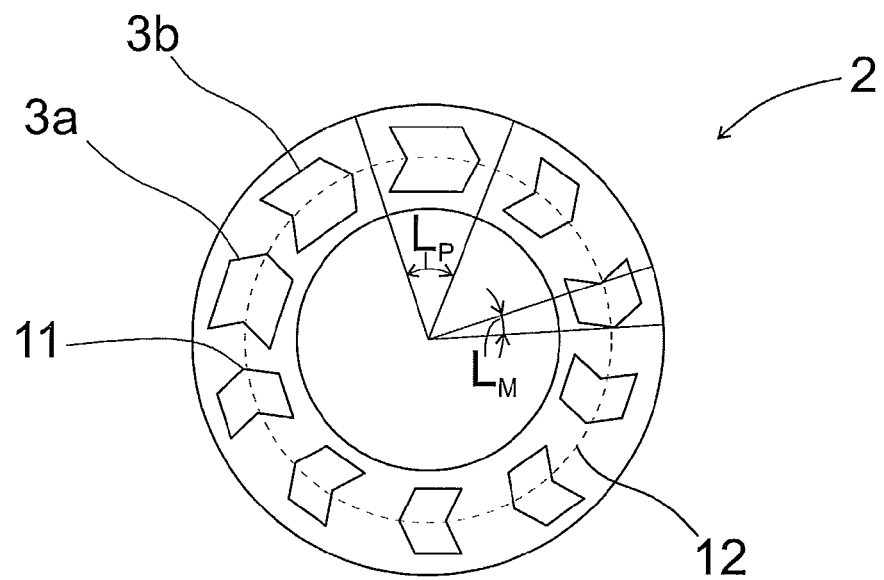
FIG. 2 illustrates a rotor of an axial flux motor according to the invention as viewed from the direction of the axis of rotation

FIG. 2 illustrates a rotor 2 of an axial flux motor according to the invention as viewed from the direction of the axis of rotation. The rotor 2 can be formed e.g. in the rotating piece 16 of the hoisting machine 14 of FIG. 6 such that permanent magnets 3a, 3b are fixed onto the surface of the rotating piece 16 of the hoisting machine 14 consecutively at regular intervals in a ring 12 in the direction of the rotational movement. The permanent magnets 3a, 3b are arrow-shaped; additionally, all the permanent magnets have the same width at the point $L_M$ of the center line of the magnet. The magnetic poles of two consecutive permanent magnets 3a, 3b are of opposite directions to each other, such that the strength vectors of the magnetic field produced by the consecutive permanent magnets are of opposite directions to each other. The dimensions and placement of the permanent magnets, as likewise the slot inclination of the permanent magnets, are according to the embodiment of FIG. 1. The stator 4 of the hoisting machine of FIG. 6 comprises a concentrated fractional-slot winding, the slots per pole and phase of which winding is smaller than 0.5. The stator 4 is disposed in the stationary frame part 15 of the hoisting machine. The rotating piece 16 of the hoisting machine also comprises a traction sheave 17, which comprises rope grooves for the traction ropes. The stator and the rotor are disposed facing each other in the hoisting machine 14 such that an air gap 8 in the direction of the axis of rotation 9 remains between them. The magnetic flux of the motor passes over the air gap 8 when it rotates between the rotor 2 and the stator 4.

Figure 3:
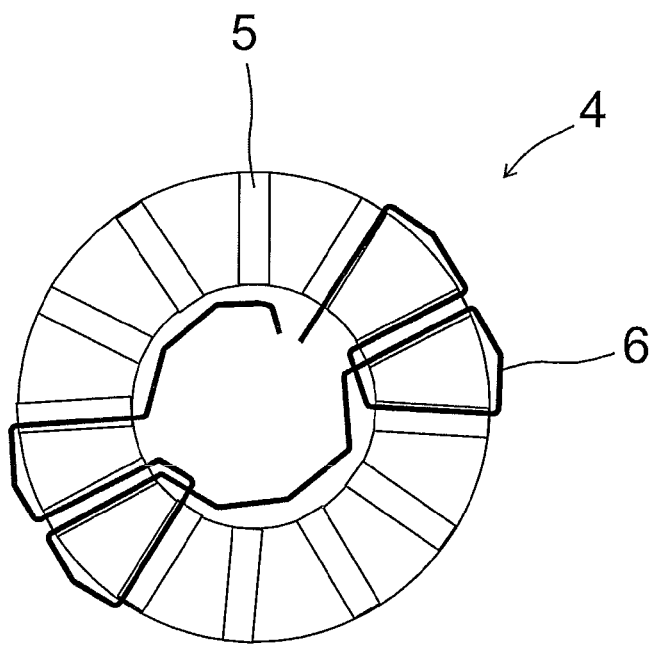
FIG. 3 illustrates a stator of an axial flux motor according to the invention as viewed from the direction of the axis of rotation
Figure 6:
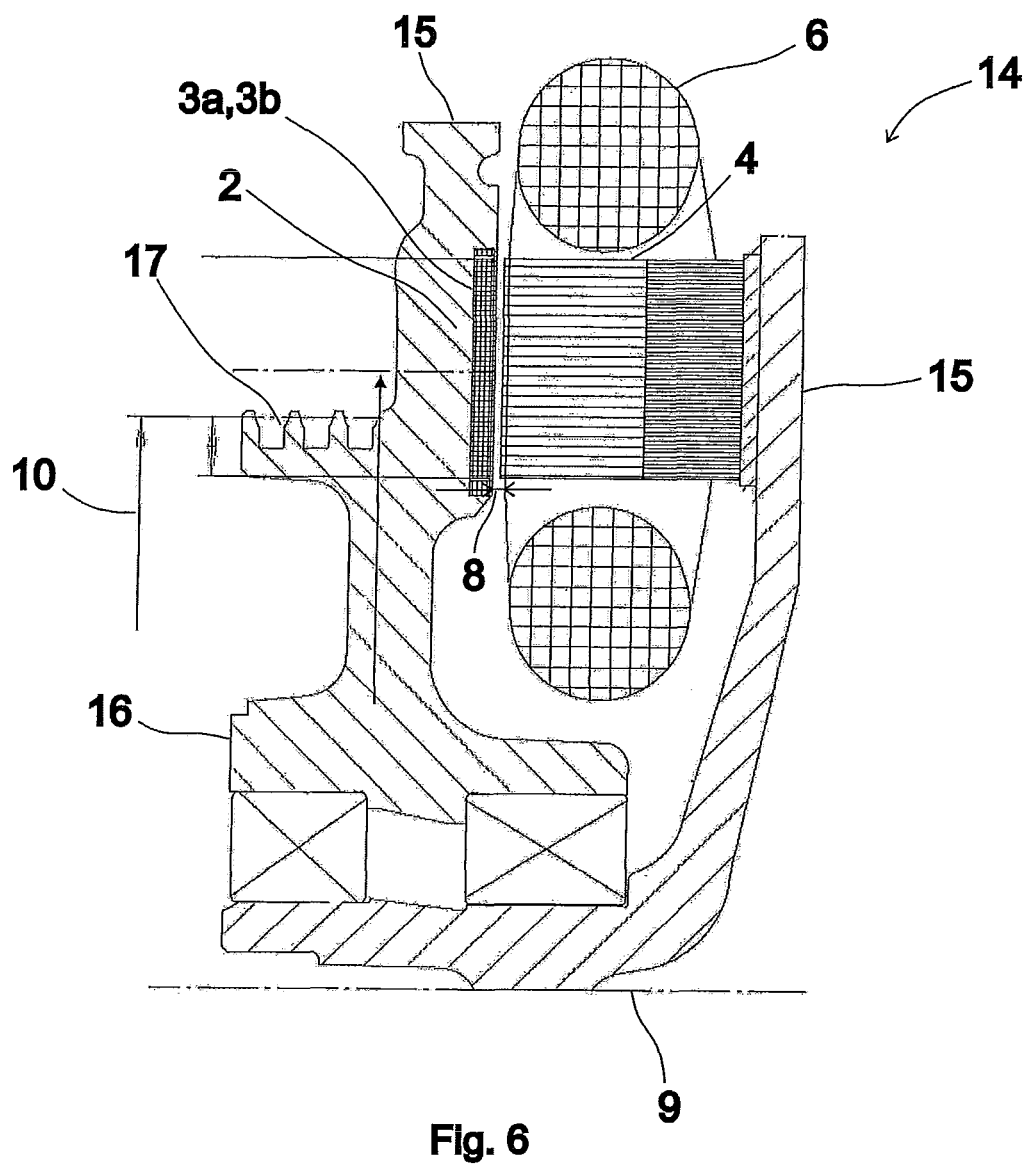
FIG. 6 presents a part of one hoisting machine according to the invention, sectioned open upwards from the axis of rotation of the hoisting machine in the direction of the radius

FIG. 3 presents one possible stator 4 of the hoisting machine 14 of FIG. 6. The stator 4 of FIG. 3 comprises 12 slots, and there are three phases in the stator winding. The rotor according to FIG. 2, on the other hand, comprises 10 poles, because each permanent magnet forms a magnetic pole in the rotor. Therefore, when using a rotor according to FIG. 2 and also a stator according to FIG. 3, 0.4 is obtained as the slots per pole and phase of the motor. In a preferred embodiment of the invention the slots per pole and phase is 0.3. In this case the motor most preferably comprises 36 stator slots, and the number of magnetic poles of the rotor is 40. There are 40 permanent magnets, i.e. as many as there are magnetic poles.

The permanent magnets 3a, 3b of the rotor of FIG. 2 are fitted into a fixing matrix, which is in turn fixed to the surface of a rotating piece 16 of the hoisting machine. The thickness of the permanent magnets in the direction of the air gap 8 is essentially constant. The rotating piece 16 is made from ferromagnetic material in the proximity of the permanent magnets 3a, 3b, in which material the magnetic flux flowing in the magnetic circuit circulates.

With the shaping and placement according to the invention of the permanent magnets 3a, 3b, the torque ripple of the motor is reduced by reducing the harmonics of the magnetic flux circulating in the air gap of the motor. Harmonics could also be reduced with shapes, such as polygons, that differ from or are adapted from the shape of an arrow, the width of which shapes at the point of the center line of the magnet, and the slot inclination of which shapes, are however within the scope of the limit values specified in the invention. One possible shape of a permanent magnet is a quadrangle, the direction of at least one side of which differs from the direction of the stator slot within the limits of slot inclination 2 presented in the invention. On the other hand one or more corners of a permanent magnet can also be rounded.

Figure 4:
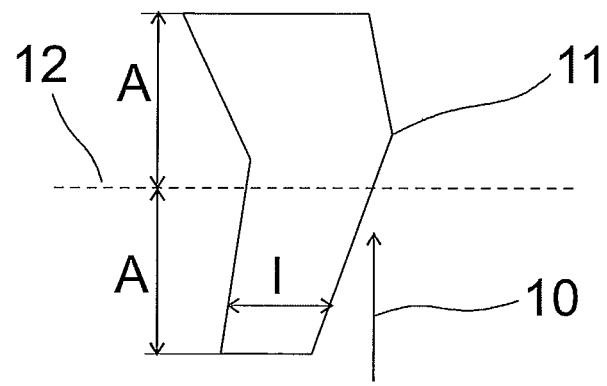
FIG. 4 illustrates a permanent magnet of an axial flux motor according to the invention as viewed from the direction of the air gap

FIG. 4 presents one such permanent magnet, slightly adapted from the shape of an arrow, that is applicable e.g. to any of the axial flux motors described above, wherein the tip 11 of the arrow-shaped permanent magnet is disposed farther from the axis of rotation 9 of the rotor than the center line 12 that runs via the geometrical center point of the permanent magnet 3a and that is disposed in a ring in the direction of the rotational movement of the rotor. The center line 12 refers to such a ring in the direction of rotational movement of the rotor that is situated at essentially the geometrical center point of the magnet, in other words the length of the magnet in the direction A of a right angle to the center line is the same on both sides of the center line 12. In addition, the width 1 of the permanent magnet increases when the distance 10 from the axis of rotation 9 of the rotor increases in the direction of the arrow 10, in which case a larger part of the magnetic field produced by a permanent magnet is situated farther from the axis of rotation of the rotor. With this type of shaping of the permanent magnet, the torque production of a motor can be improved.

Figure 5:
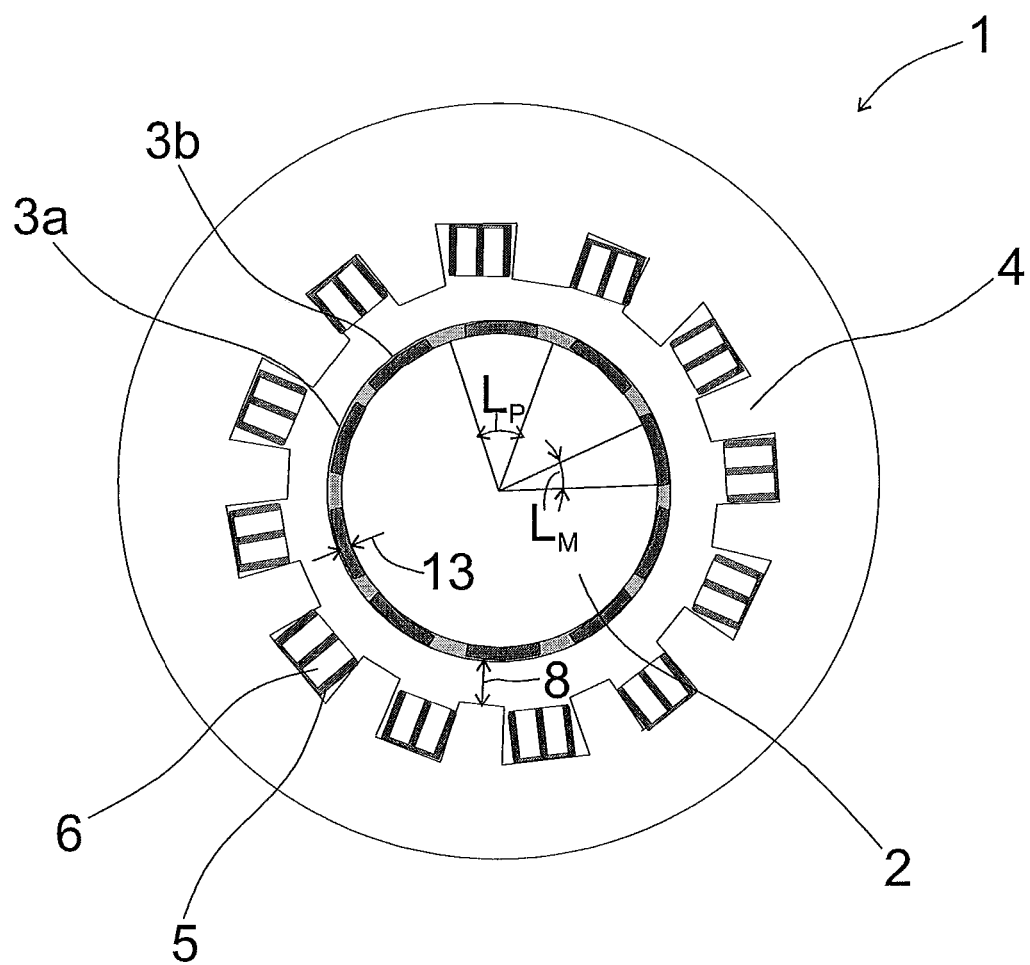
FIG. 5 illustrates a radial flux motor according to the invention as viewed from the direction of the axis of rotation

FIG. 5 illustrates a radial flux motor according to the invention as viewed from the direction of the axis of rotation. The permanent magnets 3a, 3b are on the surface of the rotor 2. The permanent magnets 3a, 3b are fixed to a fixing matrix and disposed consecutively on the surface of the rotor in a ring in the direction of the rotational movement. The permanent magnets 3a, 3b are essentially arrow-shaped. The dimensions and placement of the permanent magnets 3a, 3b on the rotor 2 are selected such that the ratio $$\frac{L_M}{L_P}$$

of the width of each permanent magnet 3a, 3b at the point $L_M$ of the center line 12 of the magnet and the width $L_P$ of the magnetic pole of the rotor is at least 2/3 and at most 4/5. In degrees of electrical angle this means that when the width $L_P$ of a magnetic pole is 180 degrees of electrical angle, the width of the permanent magnet at the point $L_M$ of the center line 12 of the magnet ranges between 120-144 degrees of electrical angle. The motor also comprises a stator 4, which comprises slots 5 for the stator winding 6. The stator slots 5 are disposed at a right angle with respect to the ring in the direction of the rotational movement. The stator in FIG. 5 comprises open slot apertures, but the motor can also have semi-open or closed slot apertures. The direction of the sides of a permanent magnet that end in a tip, as likewise of the sides disposed on the opposite side of the permanent magnet, differs from the direction of the stator slots 5 with a slot inclination s, the ratio $$\frac{s}{L_P}$$

of which slot inclination s and the width $L_P$ of a magnetic pole of the rotor is at least 5/36 and at most 1/5. In degrees of electrical angle this means that the slot inclination s ranges between 25-36 degrees of electrical angle. A concentrated fractional-slot winding is fitted into the stator slots, the slots per pole and phase q of which winding is smaller than 0.5. When the slots per pole and phase is less than 0.5, with the shaping and placement of a permanent magnet that are presented above the harmonics of the magnetic flux circulating in the air gap of a radial flux motor can be reduced, in which case the torque ripple of the motor that is produced by vibration also decreases; and at the same time disturbing noise caused by operation of the motor also decreases.

Figure 7:
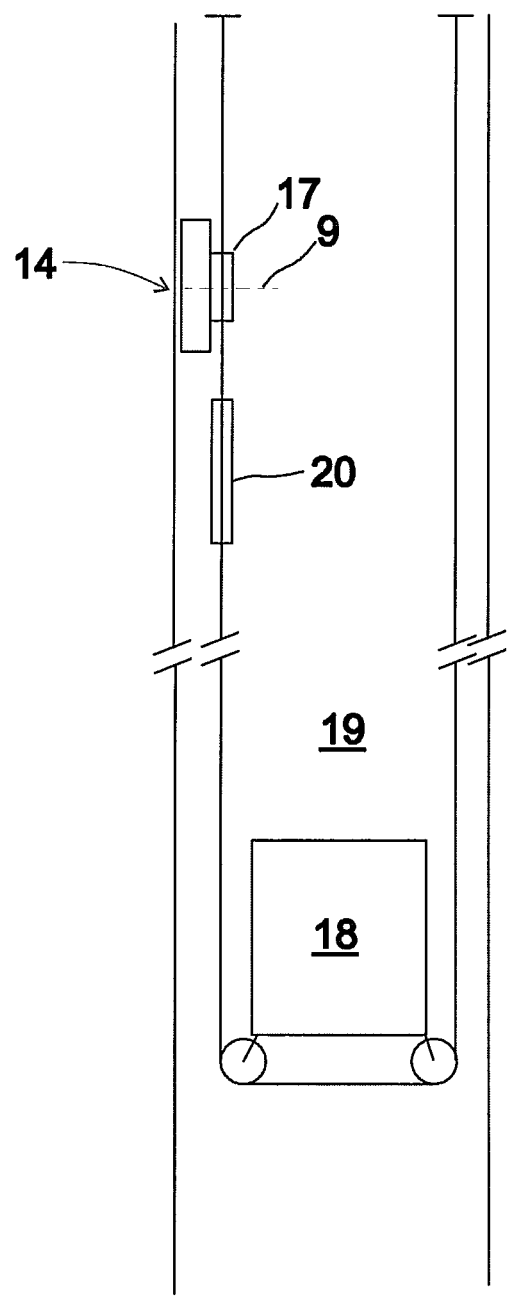
FIG. 7 presents an elevator system according to the invention, as a block diagram

FIG. 7 presents as a block diagram an elevator system, in which the elevator car 18 and the counterweight 20 are suspended in the elevator hoistway 19 with elevator ropes passing via the traction sheave 17 of the hoisting machine 14 of the elevator. The elevator car is moved by exerting a force effect on the elevator car via the hoisting ropes with the hoisting machine 14 of the elevator. The power supply to the hoisting machine 1 of the elevator occurs with a frequency converter (not shown in figure) connected between the electricity network and the hoisting machine 14 of the elevator. The frequency converter and the hoisting machine 14 of the elevator are disposed in the elevator hoistway, in connection with a wall of the elevator hoistway 19 outside the path of movement of the elevator car 18. The hoisting machine 14 of the elevator is of the type presented in FIG. 6. As a result of the concentrated fractional-slot winding, the hoisting machine 14 of the elevator can therefore be made flatter in its dimension in the direction of the axis of rotation 9 than a prior-art one. As can be observed from FIG. 7, a flatter hoisting machine 14 of an elevator enables increasing the width of the elevator car 18 in the direction of the axis of rotation 9 of the hoisting machine 1 of the elevator, in which case a more spacious elevator car 18 than before can be fitted into the same elevator hoistway. Likewise the placement and shaping of the rotor magnets of a hoisting machine 14 according to the invention reduces the torque ripple of the motor and makes the hoisting machine extremely quiet.

The electric motor 1 and hoisting machine 14 according to the invention are suited for use e.g. in different conveying systems and lifting systems; in addition to a passenger elevator and freight elevator system, the electric motor 1 and hoisting machine 14 can be used e.g. in mine elevators, drum drive elevators, and also in cranes. On the other hand, the electric motor according to the invention is also suited for use in e.g. escalator systems and travelator systems.

The invention is not only limited to be applied to the embodiments described above, but instead many variations are possible within the scope of the inventive concept defined by the claims below.

The invention claimed is:
1. An electric motor, which comprises a stator,
which stator comprises slots, into which slots a concentrated winding is fitted;
and which electric motor comprises a rotating rotor,
which rotor comprises permanent magnets placed consecutively in a ring in the direction of the rotational movement,
wherein the ratio

$$\left(\frac{L_M}{L_P}\right)$$

of the width of a permanent magnet at the point ($L_M$) of the center line of the magnet and the width ($L_p$) of the magnetic pole of the rotor is at least 2/3 and at most 4/5, and
wherein the direction of at least one side of at least one permanent magnet on the rotor differs from the direction of the stator slot with a slot inclination (s), the ratio $$\left(\frac{s}{L_P}\right)$$

of which slot inclination (s) and the width ($L_p$) of a magnetic pole of the rotor is at least 5/36 and at most 1/5.

2. The electric motor according to claim 1, wherein the concentrated winding is a concentrated fractional-slot winding.

3. The electric motor according to claim 2, wherein the slots per pole and phase (q) of the concentrated fractional-slot winding is smaller than 0.5.

4. The electric motor according to claim 1, wherein the air gap between the stator and the rotor is essentially in the direction of the axis of rotation of the rotor.

5. The electric motor according to claim 4, wherein the width of the permanent magnet increases when the distance from the axis of rotation of the rotor increases.

6. The electric motor according to claim 1, wherein the permanent magnet of the rotor is essentially arrow-shaped.

7. The electric motor according to claim 6, wherein the tip of the arrow-shaped permanent magnet on the rotor is disposed farther from the axis of rotation of the rotor than the center line of the aforementioned permanent magnet.

8. The electric motor according to claim 1, wherein the magnetic poles of consecutive permanent magnets are of opposite directions to each other.

9. The electric motor according to claim 1, wherein the thickness of a permanent magnet in the direction of the air gap is essentially constant.

10. A hoisting machine, wherein the hoisting machine comprises an electric motor according to claim 1.

11. The hoisting machine according to claim 10, wherein the stator of the electric motor is disposed in a stationary structure of the hoisting machine,
and in that the rotor of the electric motor is disposed in a rotating structure of the hoisting machine,
and in that the rotating structure of the hoisting machine comprises a traction sheave.

12. An elevator system, wherein the elevator system comprises a hoisting machine according to claim 11, for moving an elevator car in an elevator hoistway.

13. The elevator system according to claim 12, wherein the hoisting machine is disposed in the elevator hoistway.

14. The electric motor according to claim 2, wherein the air gap between the stator and the rotor is essentially in the direction of the axis of rotation of the rotor.

15. The electric motor according to claim 3, wherein the air gap between the stator and the rotor is essentially in the direction of the axis of rotation of the rotor.

16. The electric motor according to claim 2, wherein the permanent magnet of the rotor is essentially arrow-shaped.

* * * * *